United States Patent [19]

Obayashi et al.

[11] Patent Number: 4,478,185

[45] Date of Patent: Oct. 23, 1984

[54] AIR-FUEL RATIO AND IGNITION TIMING REGULATION BY DETECTING ENGINE RUNNING CONDITION

[75] Inventors: Hideki Obayashi, Okazaki; Tokio Kohama, Nishio; Hisasi Kawai, Toyohashi; Toshikazu Ina, Aichi; Daisaku Sawada; Takashi Shigematsu, both of Susono, all of Japan

[73] Assignees: Nippon Soken, Inc., Nishio; Toyota Jidosha Kabushiki Kaisha, Toyota, both of Japan

[21] Appl. No.: 483,753

[22] Filed: Apr. 11, 1983

[30] Foreign Application Priority Data

Apr. 12, 1982 [JP] Japan ................................. 57-59758

[51] Int. Cl.³ ........................... F02D 5/00; F02B 5/02
[52] U.S. Cl. ................................... 123/419; 123/416; 123/417; 123/436; 364/431.05
[58] Field of Search ............... 123/419, 416, 417, 436; 364/431.08, 508, 431.04, 431.05

[56] References Cited

U.S. PATENT DOCUMENTS

| | | | |
|---|---|---|---|
| 4,347,570 | 8/1982 | Akiyama et al. | 123/417 |
| 4,357,662 | 11/1982 | Schira et al. | 123/419 |
| 4,375,209 | 3/1983 | Sinniger et al. | 123/416 |
| 4,375,668 | 3/1983 | Leung et al. | 123/419 |
| 4,379,333 | 4/1983 | Ninomiya et al. | 123/419 |
| 4,413,599 | 11/1983 | Shigematsu et al. | 123/416 |

*Primary Examiner*—Raymond A. Nelli
*Attorney, Agent, or Firm*—Cushman, Darby & Cushman

[57] ABSTRACT

A method for regulating the air-fuel ratio and an ignition timing in an internal combustion engine, using a device for sensing the engine running state, a device for detecting the variation in engine combustion, a device for correcting the air-fuel ratio supplied in the engine according to the detected combustion variation, and an device for controlling the ignition timing. The ignition timing control device calculates the interpolated basic advance angle value $\theta_b$, the corrected advance angle value $\Delta\theta$, and, hence, the resultant advance angle value $\theta$ for use in the ignition timing control, so as to attain the air-fuel ratio giving the best rate of fuel consumption.

11 Claims, 22 Drawing Figures

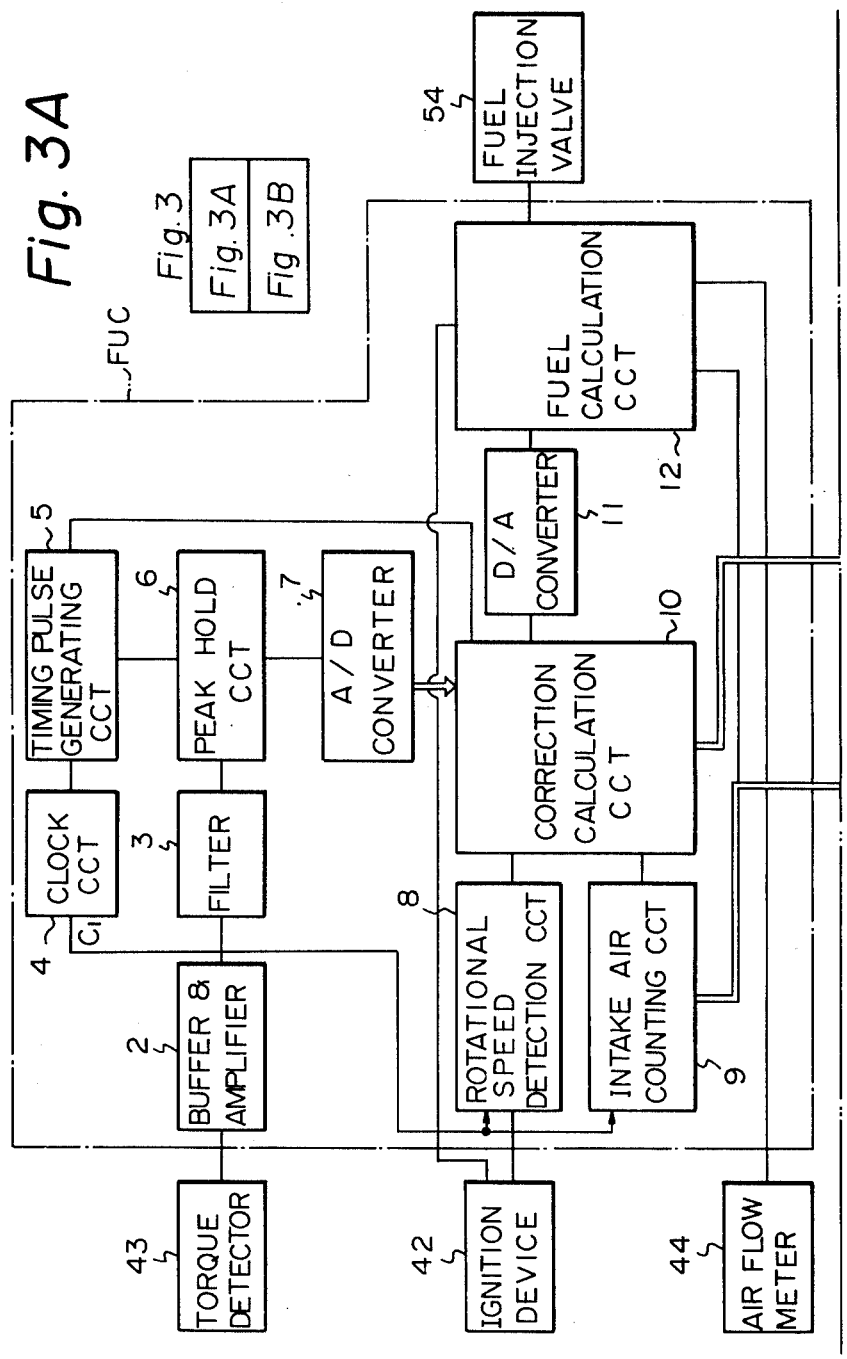

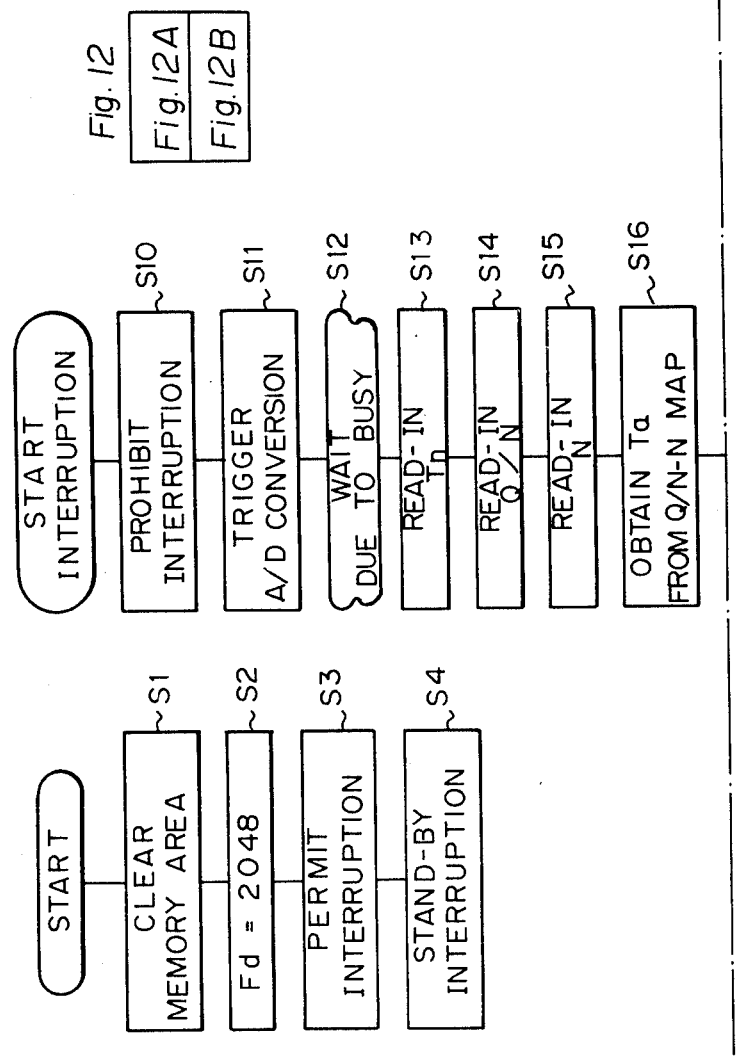

Fig. 13

|  | $N_1$ | $N_2$ | -------- | $N_n$ | -------- | $N_N$ |
|---|---|---|---|---|---|---|
| $Q/N_1$ | $Ta_{1,1}$ | $Ta_{2,1}$ | -------- | $Ta_{n,1}$ | -------- | $Ta_{N,1}$ |
| $Q/N$ | $Ta_{1,2}$ | $Ta_{2,2}$ | -------- | $Ta_{n,2}$ | -------- | $Ta_{N,2}$ |
| ⋮ | ⋮ | ⋮ | | ⋮ | | ⋮ |
| $Q/N_m$ | $Ta_{1,m}$ | $Ta_{2,m}$ | -------- | $Ta_{n,m}$ | -------- | $Ta_{N,m}$ |
| ⋮ | ⋮ | ⋮ | | ⋮ | | ⋮ |
| $Q/N_M$ | $Ta_{1,M}$ | $Ta_{2,M}$ | -------- | $Ta_{n,M}$ | -------- | $Ta_{N,M}$ |

AIR-FUEL RATIO AND IGNITION TIMING REGULATION BY DETECTING ENGINE RUNNING CONDITION

BACKGROUND OF THE INVENTION

1. Field of the Invention

The present invention relates to a method and a device for regulating the air-fuel ratio and the ignition timing in an internal combustion engine, particularly in an automotive internal combustion engine of the spark ignition type.

2. Description of the Prior Art

Recent trends in internal combustion engines have been for cleaner engine emission and, from the viewpoint of fuel-economy, reduction of the specific fuel consumption.

The engine emission and specific fuel consumption of internal combustion engines are closely related to the air-fuel ratio supplied in the engines, as illustrated in FIG. 1 attached to the specification for illustrating the operation characteristics of the internal combustion engine.

In general, in order to attain both cleaner emission and reduced fuel consumption, it is advantageous to operate an internal combustion engine in the lean air-fuel mixture range. However, misfires tend to occur in the lean air-fuel mixture range. Individual variations in operating characteristics and deterioration of engines, carburetors, and other parts make it impossible for engines to be operated in the range close to the misfire limit. Therefore, the usual practice is to operate an engine in the stable range with an air-fuel ratio which is richer by 2 than the misfire limit air-fuel ratio. However, operation of an engine in such a range is not desirable from the viewpoint of cleaner emission and fuel economy. This is an important problem in the operation of an internal combustion engine.

Other problems are that the optimum air-fuel ratio giving the best rate of fuel consumption can change, even under the same engine running conditions depending on ambient conditions such as the atmospheric pressure and temperature. Also, the ignition timing, which is closely related to the air-fuel ratio, affects the engine output and, accordingly, the rate of fuel consumption.

Now, the minimum rate of fuel consumption is attained at the lean air-fuel ratio range close to the misfire limit, as can be seen from the characteristic illustrated in FIG. 1. The variation in combustion, which is related to the air-fuel ratio, becomes eminently greater as the air-fuel ratio approaches the misfire limit.

The inventors noticed the fact that, since the variation of the combustion in cylinders causes vibration of the engine body due to the torque counter force of the cylinders, the variation of the combustion can be detected by that vibration.

SUMMARY OF THE INVENTION

It is the object of the present invention to provide an imporved method and device for regulating the air-fuel ratio and the ignition timing in an internal combustion engine, in which the optimum air-fuel ratio giving the best rate of fuel consumption is attained so that cleaner emission and improve fuel economy are realized.

In accordance with the fundamental aspect of the present invention, there is provided a method for regulating an air-fuel ratio and an ignition timing in an internal combustion engine by detecting the engine running conditions, calculating a control output signal based on the detected engine running conditions, and controlling the air-fuel ratio of the engine and the ignition timing of the engine using the calculated output signal, the method comprising the steps of: carrying out a calculation, using the signals of sensors for detecting engine running conditions, to produce a signal S(12) for controlling the amount of fuel so as to attain the lean air-fuel ratio which does not cause any combustion variations; obtaining a read-out basic advance angle value $\theta_b(1)$ on the basis of the detected engine running conditions; air counting circuit; obtaining an interpolated basic advance angle value $\theta_b$ on the basis of the obtained read-out basic advance angle value $\theta_b(1)$; obtaining a read-out advance angle correction value $\Delta\theta(1)$ on the basis of the detected engine running conditions; obtaining an interpolated advance angle correction value on the basis of the obtained read-out advance angle correction value $\Delta\theta(1)$; obtaining an ignition timing value on the basis of the detected engine running conditions and the fuel amount for attaining a lean air-fuel ratio; and producing an ignition timing signal representing the ignition timing corresponding to the lean air-fuel ratio.

BRIEF DESCRIPTION OF THE DRAWINGS

In the drawings,

FIGS. 3a and 3b are block diagrams of the fuel control unit and the ignition timing control unit used in the device of FIG. 2;

FIGS. 12a and 12b are an example of a flow chart of the operation of the fuel control unit;

FIG. 13 is a map of Q/N versus N;

DESCRIPTION OF THE PREFERRED EMBODIMENTS

Figure 2:
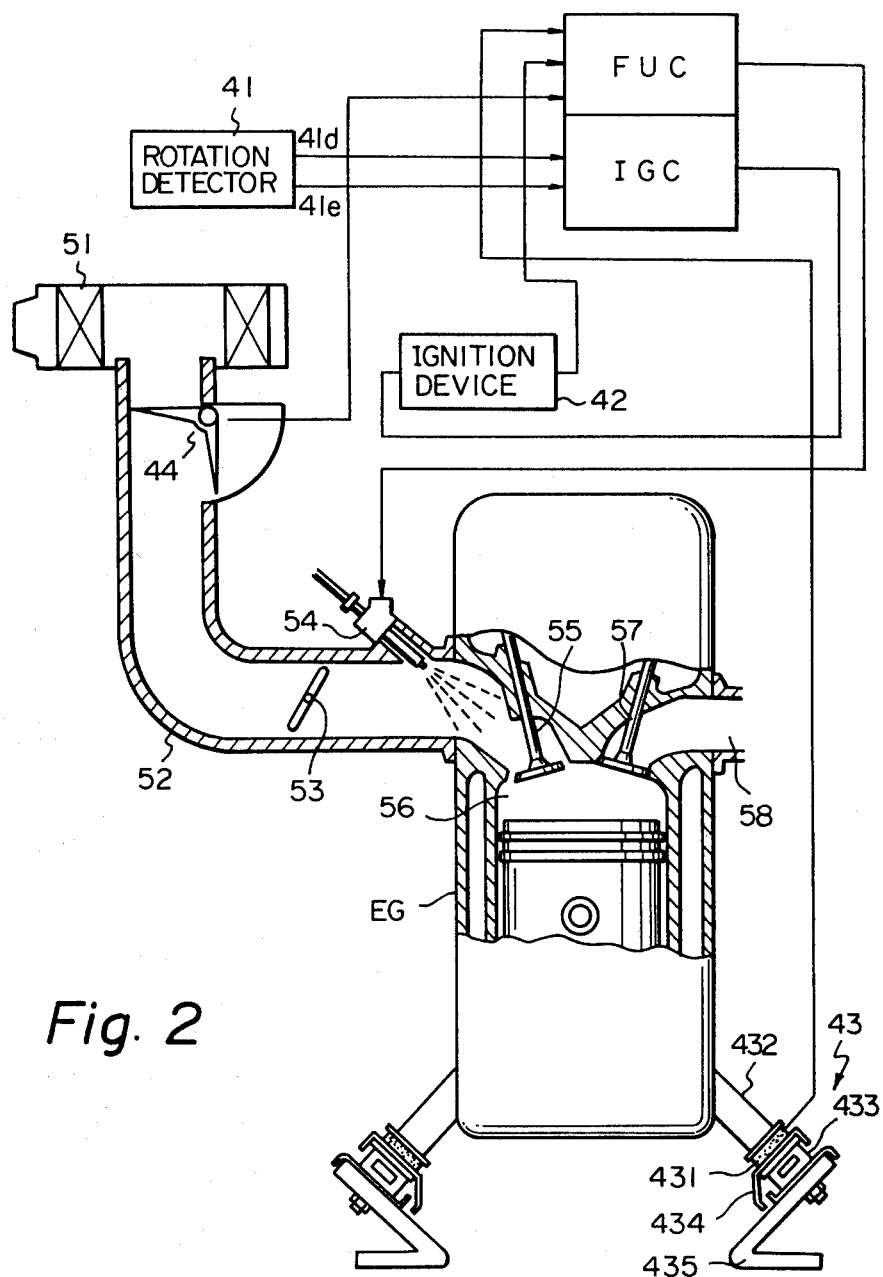
FIG. 2 illustrates a device for regulating the air-fuel ratio and the ignition timing in an internal combustion engine according to an embodiment of the present invention.
Figure 3B:
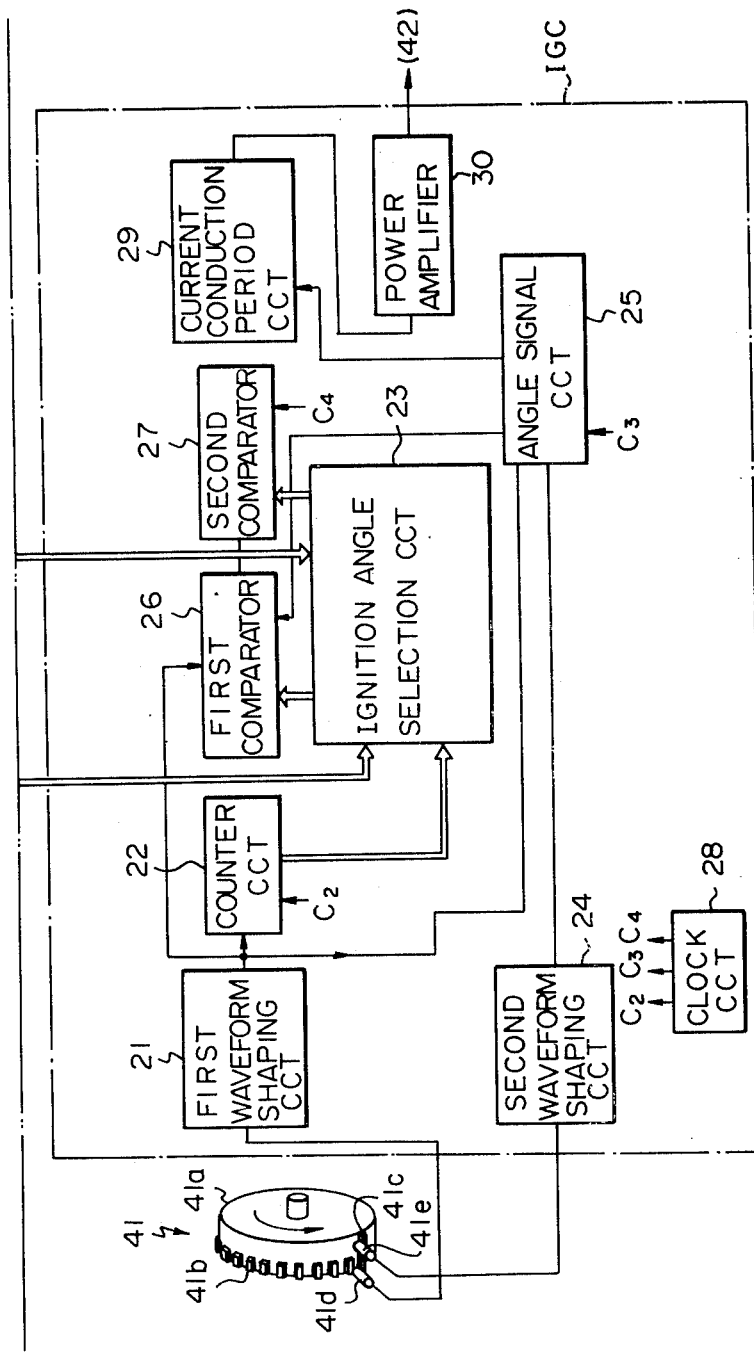

A device for regulating the air-fuel ratio and the ignition timing in an internal combustion engine is illustrated in FIG. 2. The fuel control unit and the ignition timing control unit used in the device of FIG. 2 are illustrated in FIG. 3.

The device of FIG. 2 includes an internal combustion engine EG of the spark ignition type used for driving an automobile. The air for combustion is taken into a combustion chamber 56 of the engine EG through an air cleaner 51, an air flow meter 44, an air intake pipe 52, and an air intake valve 55. A throttle valve 53 which is actuated by a driver of the automobile is provided in the air intake pipe 52. The fuel is injected from a fuel injection solenoid valve 54 toward the air intake valve 55. The air-fuel mixture is combusted in the combustion chamber 56, and the resulting exhaust gas is emitted through an exhaust valve 57 and an exhaust pipe 58 to the atmosphere.

A fuel control unit FUC and an ignition timing control unit IGC are provided in the device of FIG. 2. The fuel control unit FUC is provided for calculating the fuel amount supplied to the engine EG according to the engine running state, supplying the driving signal to the fuel injection valve 54, and thus controlling the fuel amount supplied to the engine EG. The signals from the air flow meter 44, which detects the intake air amount; an ignition device 42; and a torque detector 43, which detects the variation of torque of the engine, are supplied to the fuel control unit FUC. Other than obtaining the intake air amount by the air flow meter 44, the intake air amount may be obtained from the negative pressure downstream of the throttle valve 53 in the air intake pipe 52 and from the engine rotational speed. A rotation detector 41 is provided in the device of FIG. 2. The engine rotational speed may be obtained by detecting the rotation signals from a ring gear, distributor, or the like (not shown) which rotates in synchronization with the engine rotation.

The torque detector 43 is mounted on a support mount 435 supporting the engine EG by using a screw bolt. The torque detector 43 detects the vibration of the engine around the crankshaft in the lean air-fuel ratio range running of the engine by using, for example, piezoelectric elements arranged in plural directions, such as more than four directions, and produces an analog signal proportional to the variation of mechanical torque of the engine. Although two torque detectors are provided for one engine in the device of FIG. 2, it is possible to detect the torque using only a single torque detector.

The torque detector 43 includes a pressure sensor 431, a rubber mount 433, and a rubber mount cover 434. The pressure sensor 431, the rubber mount cover 434, and the rubber mount 433 are assembled in sequence from an arm 432 to the support mount 435. A pressure sensor on the market using, for example, a piezoelectric element can be used for the pressure sensor 431.

The structures of the fuel control unit FUC and the ignition timing control unit IGC are illustrated in FIG. 3. In the fuel control circuit FUC, an amplifier portion 2 is of a known type constituted by a buffer and an amplifier. For a band-pass filter 3, which picks up only output analog signals within the range from 1 Hz to several Hz of the amplifier portion 2, for example, a circuit of Model 852 manufacured by Rockland Systems Co. is used. A clock circuit 4 is of a known type constituted by an oscillator circuit using a crystal oscillator and a counter which divides the frequency of the output signal of the oscillation circuit.

A timing pulse generation circuit 5 produces a reset signal for a peak hold circuit 6 and an interuption signal for a correction calculation circuit 10 on the basis of the clock signal from a clock circuit 4.

Figure 4:
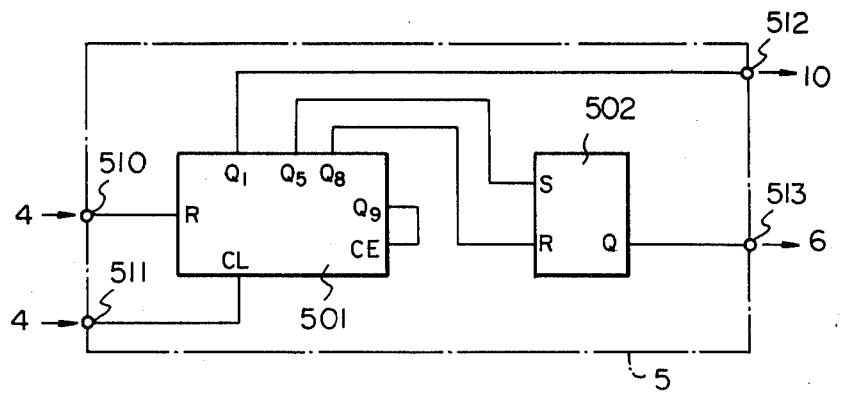
FIG. 4 is a circuit diagram of the timing pulse generation circuit used in the fuel control unit of FIG. 3.

The structure of the timing pulse generation circuit 5 is illustrated in FIG. 4. Clock signals of 2 Hz and 5 kHz from the clock circuit 4 are supplied to input terminals 510 and 511. The input terminal 510 is connected to the reset terminal R of a divider equipped counter 501. The input terminal 511 is connected to the clock terminal CL of the counter 501. For the counter 501, for example, an integrated circuit CD4017 manufactured by Radio Corporation of America is used. The output signal Q1 thereof is used for a signal for interruption calculation in the correction calculation circuit 10. Output termials Q5 and Q8 are connected to a set terminal S and reset terminal R of an R-S flip-flop circuit 502. An output terminal Q9 is connected to a clock enable terminal CE. For the R-S flip-flop circuit 502, for example, an integrated circuit CD4013 manufactured by Radio Corporation of America is used. An output terminal Q thereof is connected through a terminal 513 to the peak hold circuit 6.

The operation of the timing pulse generation circuit 5 will be explained below. The counter 501, which receives a pulse signal of 2 Hz at its reset terminal R, commences the counting when the potential of the pulse is changed from "1" to "0". The clock signal of 5 kHz is supplied to the clock input terminal CL of the counter 501. A pulse is produced from the Q1 output terminal when a first pulse is supplied to the clock input terminal CL. When a ninth pulse is supplied to the clock input terminal CL, the potential of the Q1 output terminal becomes "1", and the potential of the clock enable terminal becomes "1". Hence, the clock signal is prevented from being supplied until the next resetting. Accordingly, a desired pulse is delivered from the Q1 output terminal, which pulse is used as a trigger pulse for commencing the interruption calculation in the correction calculation circuit 10 through a terminal 512.

The output signals from Q5 and Q8 are used as set and reset signals for the R-S flip-flop circuit 502, the Q output terminal of which delivers a desired pulse. The delivered pulse is supplied to the peak hold circuit 6 through the terimal 513. The supplied pulse has a width of approximately 600 $\mu$s and is used for the reset signal for the peak hold circuit 6.

Figure 5:
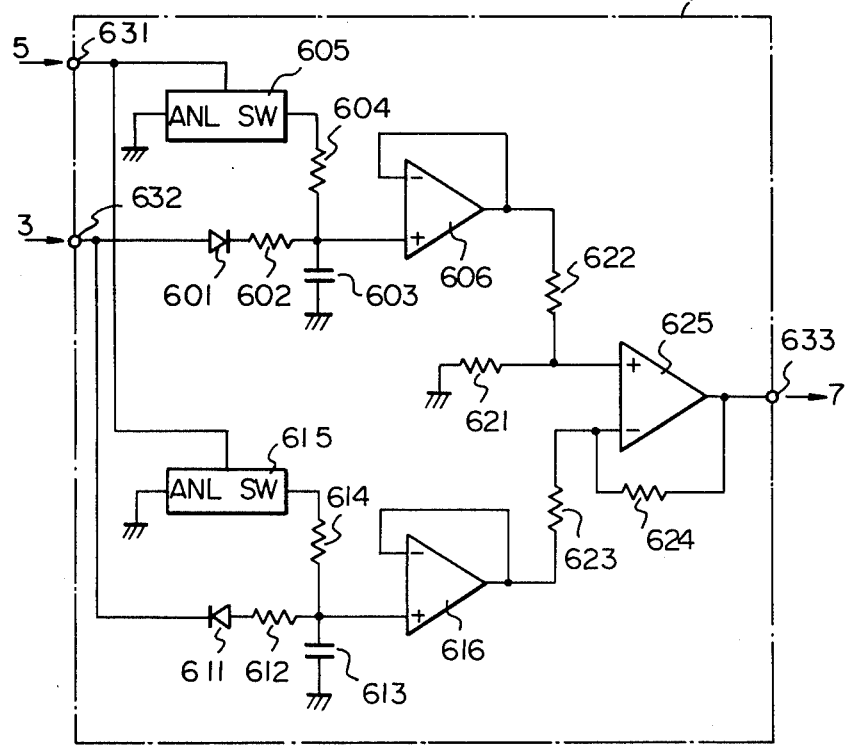
FIG. 5 is a circuit diagram of the peak hold circuit used in the fuel control unit of FIG. 3.

The structure of the peak hold circuit 6 is illustrated in FIG. 5. The positive electrode of a diode 601 and the negative electrode of a diode 611 are connected to the output terminal of the band pass filter 3. The negative electrode of the diode 601 is connected to one terminal of a resistor 602. The other terminal of the resistor 602 is connected to the positive electrode of a capacitor 603, the noninverting inut terminal of a buffer amplifier 606, and one terminal of a resistor 604. The negative electrode of the capacitor 603 is grounded. The other terminal of the resistor 604 is connected to one terminal of an analog switch 605. The other terminal of the analog switch 605 is grounded. The control terminal of the analog switch 605 is connected to a predetermined signal output terminal of the timing pulse generation circuit 5. In the buffer amplifier 606, an inverting input terminal is connected to the output terminal.

The positive electrode of the diode 611 is connected to one terminal of a resistor 612. The other terminal of the resistor 612 is connected to the negative electrode of a capacitor 613, the noninverting input terminal of a buffer amplifier 616, and one terminal of a resistor 614. The positive electrode of the capacitor 613 is grounded. The other terminal of the resistor 614 is connected to one terminal of an analog switch 615. The other terminal of the analog switch 615 is grounded, and the control terminal of the same is connected to a predetermined signal terminal of the timing pulse generation circuit 5. In the buffer amplifier 616, an inverting input terminal is connected to the output terminal.

The output terminal of the buffer amplifier 606 is connected to one terminal of a resistor 622, the other terminal of which is connected to the noninverting input terminal of a differential amplifier 625 and one terminal of a resistor 621. The other terminal of the resistor 621 is grounded.

The output terminal of the buffer amplifier 616 is connected to one terminal of a resistor 623, the other terminal of which is connected to the inverting input terminal of the differential amplifier 625. The output terminal of the buffer amplifier 625 is connected through the output terminal 633 to the analog-to-digital converter 7 and to one terminal of a resistor 624. The other terminal of the resistor 624 is connected to the inverting input terminal of the differential amplifier 625.

The operation of the peak-hold circuit 6 will now be explained. During the supply of a predetermined pulse signal from the timing pulse generation circuit 5 to control input terminals of the analog switches (ANL SW) 605 and 615, the analog switches 605 and 615 are closed and the capacitors 603 and 613 are discharged through low resistance resistors 604 and 614. Hence, the voltages of the capacitors 603 and 613 are reset to 0 volt. After that, when an output signal having a predetermined waveform is supplied from the band pass filter 3 through an input terminal 632, the capacitor 603 is charged through the diode 601 and the resistor 602 to a positive voltage. The voltage of the capacitor 603 is held at the positive peak voltage during the period from one resetting to the next resetting. Application of the voltage of the capacitor 603 to the buffer amplifier 606, which has a high input impedance, causes the buffer amplifier 606 to deliver an output signal having the desired waveform.

When a signal having a predetermined waveform is supplied through the input terminal 632, on the other hand, the capacitor 613 is charged through the diode 611 and resistor 612 to a negative voltage. The voltage of the capacitor 613 is held at the negative peak voltage during the period from one resetting to the next resetting. Application of the voltage of the capacitor 613 to the buffer amplifier 616, which has a high input impedance, causes the buffer amplifier 616 to deliver an output signal having the desired waveform.

A signal representing the difference between the output signals of the buffer amplifiers 606 and 616 is obtained by the differential amplifier 625. Thus, the difference between the positive peak voltage and the negative peak voltage during the period from one resetting to the next resetting is produced at the output terminal of the differential amplifier 625.

Figure 6:
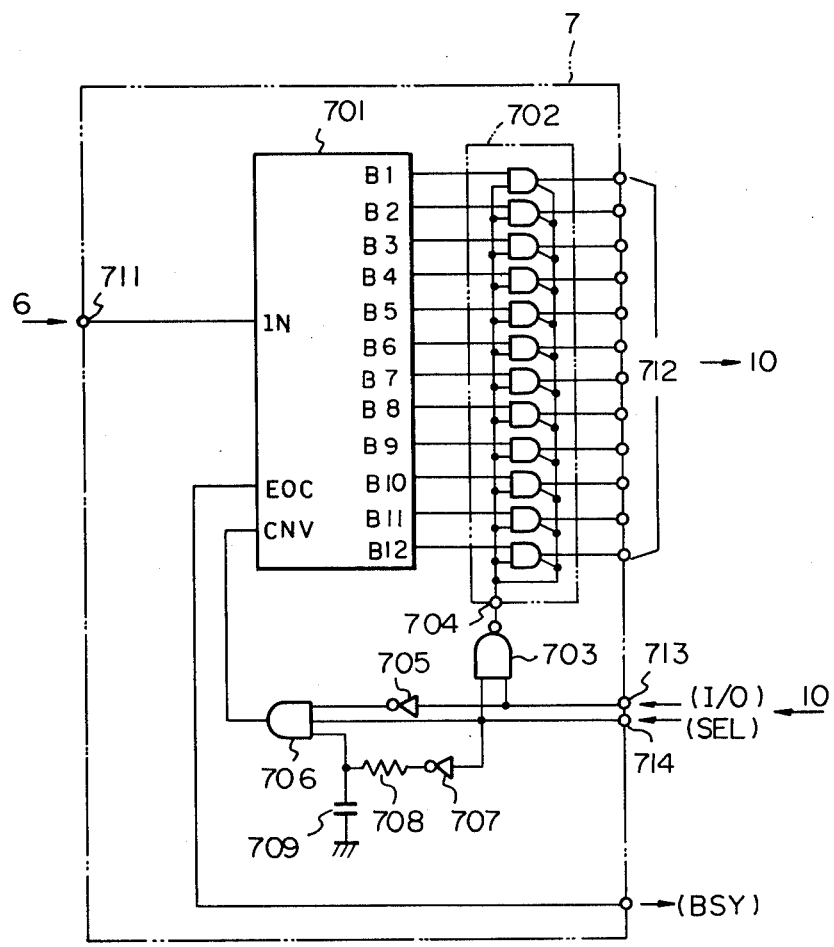
FIG. 6 is a circuit diagram of the analog-to-digital converter circuit used in the fuel control unit of FIG. 3.

The structure of the analog-to-digital converter circuit 7 is illustrated in FIG. 6. An input/output control signal from the correction calculaton circuit 10 is supplied to a NAND gate 703 and is supplied through an inverter 705 to an AND gate 706. The device select (SEL) signal from the correction calculaton circuit 10 is supplied to the NAND gate 703 and the AND gate 706. A delay circuit is constituted b an inverter 707, a resistor 708, and a capacitor 709. The SEL signal is supplied to the AND gate through this delay circuit.

The AND gate 706 delivers a pulse signal having a width of the order of 100 ns which is supplied to the analog-to-digital conversion command terminal CNV of an analog-to-digital converter 701 of the successive comparison type. For the analog-to-digital converter 701, for example, a circuit ADC80AG-12 manufactured by Burr Brown Co. is used.

An EOC terminal for the end of conversion of the analog-to-digital converter 701 is connected to the busy signal terminal BSY. The output terminals B1 through B12 are connected through a three-state buffer 702 to the bus line of the correction calculation circuit 10. For the three-state buffer 702, for example, an integrated circuit TC5012 manufactured by Tokyo Shibaura Electric Co. is used.

The operation of the analog-to-digital converter circuit 7 will now be explained. When a predetermined signal is supplied from the timing pulse generation circuit 5 to the correction calculation circuit 10, the execution of the program is interrupted and the program for the analog-to-digital conversion procedure is executed. In accordance with a command to start analog-to-digital conversion, a predetermined pulse is supplied to the conversion command terminal CNV of the analog-to-digital converter 701. The conversion operation is started at the rising edge of this pulse. Simultaneously, the potential of the output signal at the terminal EOC is raised to "1".

The terminal EOC is connected to the busy signal terminal BSY of the device control unit DCU of the correction calculation circuit 10. Hence, the completion of the command for reading-in of the analog signal from the peak hold circuit 6 is not carried out until the potential of the output signal at the EOC terminal is raised to "0". Both of the potential of the input/output control signal and the SEL signal are maintained at "1" until the potential of the output signal at the EOC terminal is raised to "0". The analog-to-digital converter 701 of the successive comparison type conducts the conversion operation while the potential of the output signal is at the potential "1" to deliver the signal of digitalized decimal data at the output terminals B1 through B12.

When the analog-to-digital conversion operation is completed, the potential of the outut signal at the terminal EOC becomes a potential "0", and the standby state for reading-in command of the correction calculation circuit 10 is cancelled. Hence, the analog signal data from the peak hold circuit 6 is read-in to the correction calculation circuit 10.

Figure 7:
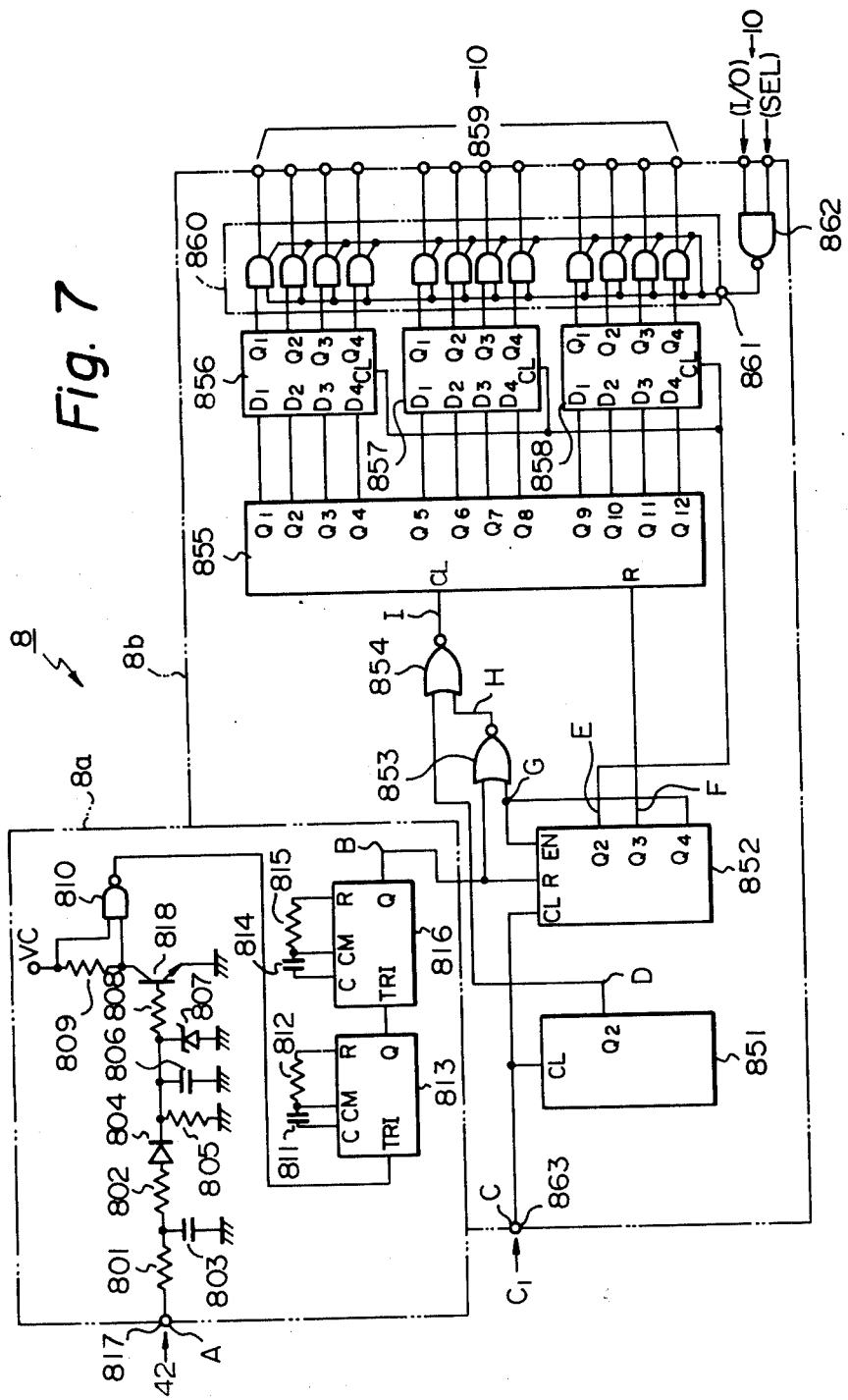
FIG. 7 is a circuit diagram of the rotational speed detection circuit used in the fuel control unit of FIG. 3.

The structure of the rotational speed detection circuit 8 is illustrated in FIG. 7. The rotational speed detection circuit 8 includes a pulse shaping circuit 8a and a counting circuit 8b.

The pulse from the negative terminal of the ignition coil 42 is supplied to the input terminal 817 of the pulse shaping circuit 8a which terminal 817 is connected to one terminal of a resistor 801. The other terminal of the resistor 801 is connected to one terminal of a resistor 802 and one terminal of a capacitor 803, the other terminal of the capacitor 803 being grounded. The other terminal of the resistor 802 is connected to the anode of a diode 804, the cathode of which diode 804 is connected to each of one terminals of a resistor 805, a capacitor 806, a zener diode 807, and a resistor 808. The other terminals of the resistor 805, the capacitor 806, and the zener diode 807 are grounded. The other terminal of the resistor 808 is connected to the base of a transistor 818.

The emitter of the transistor 818 is grounded. The collector of the transistor 818 is connected to one terminal of a resistor 809 and one input terminal of a Schmitt NAND gate 810. A voltage source Vc of +5 volts is supplied to the other terminal of the resistor 809 and the other input terminal of the Schmitt NAND gate 810.

The output signal of the Schmitt NAND gate 810 is supplied as a trigger pulse to a monostable multivibrator 813 including a capacitor 811 and a resistor 812. The output signal of the monostable multivibrator 813 is supplied as a trigger pulse to a monostable multivibrator 816 including a capacitor 814 and a resistor 815. For the multivibrators 813 and 816, for example, an integrated circuit CD4047 manufactured by Radio Corporation of America is used. Thus, the timing pulse signal having the desired waveform with respect to the signal from the ignition coil 42 is delivered from the monostable multivibrator 816.

The structure of the counting circuit 8b will now be explained with reference to FIG. 7. A binary counter 851 carries out counting and frequency division of the clock pulse signal $C_1$ supplied to the clock terminal CL. For the binary counter, for example, a circuit CD4024 manufactured by Radio Corporation of America is used. The counter 851 carries out frequency division of the clock signal $C_1$ of approximately 128 kHz to deliver the frequency divided signal of approximately 32 kHz from the output terminal Q2.

A counter 852 with a divider counts fundamentally the clock pulse signal $C_1$ supplied through the clock terminal CL. The counting in the counter 852 is stopped when the potential of one of the signals at the output terminals Q2 through Q4 becomes potential "1" and a signal of potential "1" is supplied to the terminal EN for stopping of the counting operation.

The output terminal Q4 is connected with the terminal EN in the counter 852. When the potential of the output signal at the output terminal Q4 becomes "1", the signal of potential "1" is supplied to the terminal EN to stop the counting. Under this condition, when a timing pulse signal from the pulse shaping circuit 8a is supplied to the reset terminal R, the counter 852 is caused to be reset to make the potential of the output terminal Q4 "0".

When the potential of the signal supplied to the reset terminal R becomes potential "0" after the time T(852) has elapsed, the counting of the counter 852 is started to deliver pulse signals in sequence from the output terminals Q2 and Q3. After that, when the potential of the output terminal Q4 becomes "1", the counting of the counter 825 is again stopped.

The output signals of the counter 851, the counter 852, and the pulse shaping circuit 8a are supplied to the clock terminal CL of a counter 855 of 12 bits through NOR gates 853 and 854. The Q3 output signal of the counter 852 is supplied to the reset terminal R of the counter 855. By obtaining NOR logic of the output signal of the pulse shaping circuit 8a and the signal of the Q3 output terminal of the counter 852, the desired pulse signal is delivered from the NOR gate 853. By obtaining NOR logic of the output signal of the NOR gate 853 and the output signal of the counter 851, the desired pulse signal is delivered from the NOR gate 854. The delivered signal is supplied to a counter 855.

At timing t1, when the waveform of the timing pulse signal falls down to potential "0" and the potential of the output signal of the NOR gate 853 becomes "1", the counting of the counter 855 is stopped. After that, the signals at the output terminals Q1 through Q12 are held and stored temporarily in shift registers 856 through 858 due to the rising edge of the waveform of the signal at the Q2 output terminal of the counter 852. For the shift registers 856 through 858, for example, a circuit CD4035 manufactured by Radio Corporaton of America is used.

When the potential of the signal at the Q3 output terminal of the counter 852 becomes "1" at timing t3, the counter 855 is reset. When the potential of the signal at the Q4 output terminal becomes "1" at timing t4, the counting of the counter 855 is started again.

Such an operation of the counter 855 is carried out in synchronization with the delivery of the ignition signal from the ignition coil 42. Accordingly, a binary signal proportional to the reciprocal 1/N of the engine rotational speed N is delivered from Q1 through Q4 terminals of each of the shift registers 856 through 858. The output characteristic of a three-state buffer 860 becomes high-impedance while the signal of potential "1" is supplied to a control terminal 861. Output terminals 859 are connected through the bus line to the correction calculation circuit 10.

Figure 8:
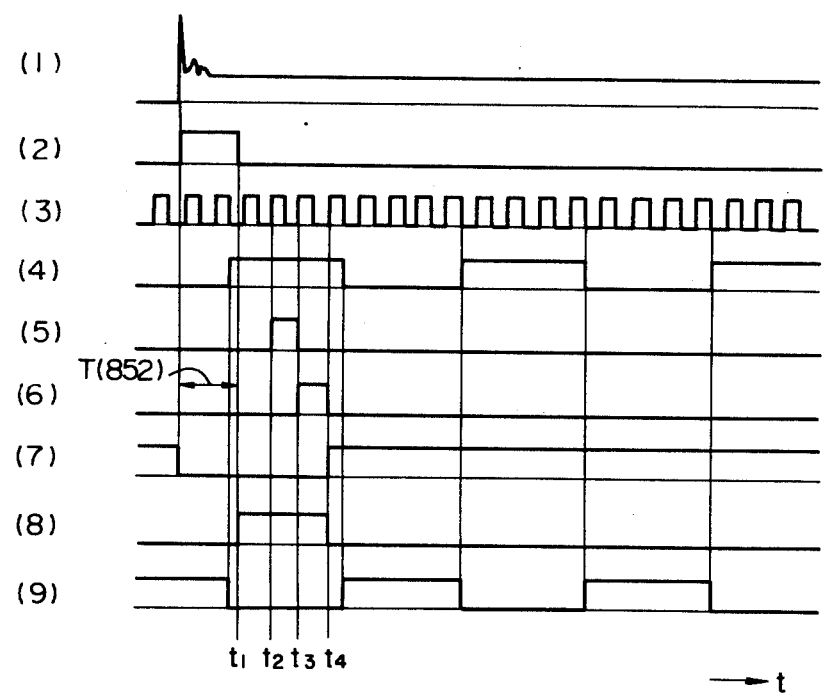
FIG. 8 illustrates the waveforms of the signals a circuit diagram of the rotational speed detection circuit used in the fuel control unit of FIG. 3.

The output signal of a NAND gate 862 is supplied to the control terminal 861. The input/output control signal and the SEL signal from the device control unit DCU in the correction calculation circuit 10 are supplied to the NAND gate 862. When the potential of the output signal of the NAND gate 862 becomes "0", a binary signal proportional to 1/N from the shift registers 856 through 858 is supplied to the correction calculation circuit 10. The waveforms of the signals in the rotational speed detection circuit 8 are illustrated in FIG. 8.

Figure 9:
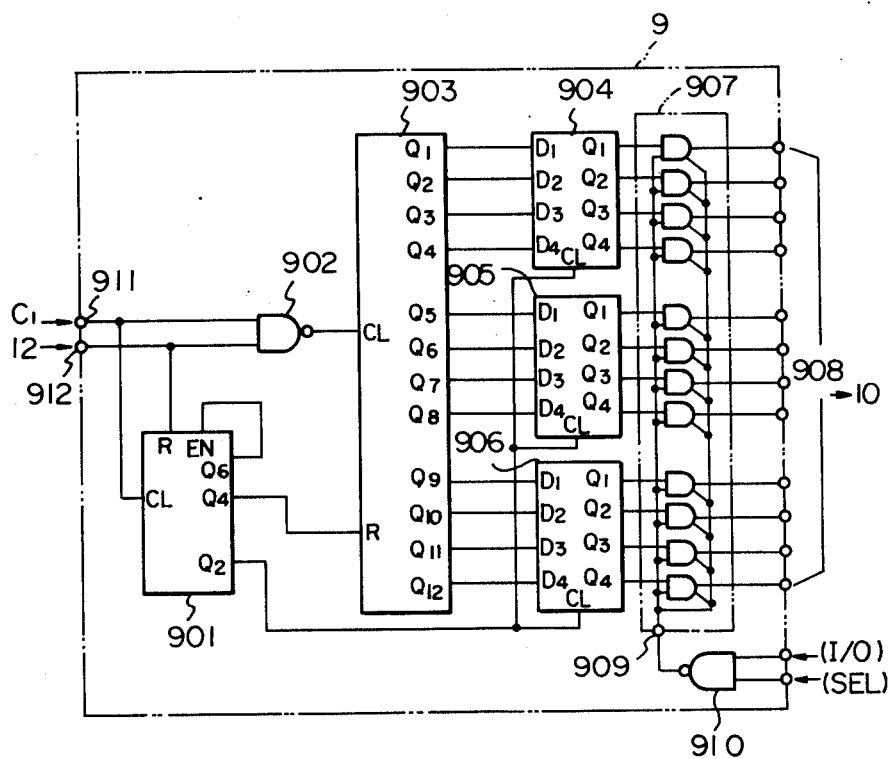
FIG. 9 is a circuit diagram of the intake air counting circuit used in the fuel cntrol unit of FIG. 3.

The structure of the intake air counting circuit 9 is illustrated in FIG. 9. A clock pulse of the order of 128 kHz is supplied through a terminal 911 to one input terminal of a NAND gate 902 and the clock terminal CL of a divider-equipped counter 901. A pulse having a width of $T_P$ proportional to an intake air amount per rotation (Q/N) is supplied through a terminal 912 to the other input terminal of the NAND gate 902 and the reset terminal R of the counter 901. For the counter 901, for example, an integrated circuit CD4017 manufactured by Radio Corporation of America is used.

The counter 901 fundamentally counts the clock pulse signal C1 supplied to the clock terminal CL. The counting of the counter 901 is stopped when the potential of one of the signals at the output terminals Q2 through Q6 becomes "1" and the signal of potential "1" is supplied to the count stop terminal EN.

The output terminal Q6 is connected with the count stop terminal EN in the counter 901. When the potential of the output terminal Q6 becomes "1", the signal of potential "1" is supplied to the count stop terminal EN to stop the counting. Under this condition, when a pulse signal from the fuel calculation circuit 12 is supplied to the reset terminal R, the counter 901 is reset. When the potential of the signal supplied to the reset terminal R becomes "0", the counting of the counter 901 is started to deliver pulse signals in sequence from the output terminal Q2 and Q4. After that, when the potential of the output terminal Q6 becomes "1", the counting of the counter is stopped again.

The signal from the output terminal Q2 is supplied to the clock terminals CL of the shift registers 904, 905, and 906. The signal from the output terminal Q4 is supplied to a reset terminal R of a counter 903. For each of the shift registers 904, 905, and 906, for example, an integrated circuit CD4035 manufactured by Radio Corporation of America is used. The output signal of the NAND gate 902 is supplied to a clock terminal CL of the counter 903.

When a pulse having a width Tp proportional to Q/N is supplied to the input terminal 912, the clock signal $C_1$ is supplied to the counter 903 during the peirod $T_P$. The number of the supplied clocks is counted so that the time-length $T_P$ is counted. After that, when the potential of the supplied clock pulse becomes "0" at timing t0, the counting of the counter 903 is stopped.

Next, when the potential of the output terminal Q2 of the counter 901 becomes "1" at timing t1, the signals from the output terminals Q1 through Q12 are stored temporarily in the shift registers 904, 905, and 906. When the potential of the output terminal Q4 of the counter 901 becomes "1" at timing t2, the counter 903 is reset and becomes the standby state for the next counting.

The operation of the counter 903 is carried out repeatedly in synchronization with the pulse having a width Tp proportional to the above-described Q/N. Hence, a decimal signal proportional to Q/N is delivered from the output terminals Q1 through Q4 of each of the shift registers 904, 905, and 906 in synchronization with the engine rotation.

The output characteristic of a three-state buffer 907 becomes high-impedance while the signal of potential "1" is supplied to a control terminal 909. The output terminals 908 are connected through a bus line to the correction calculation circuit 10. The output signal of a NAND gate 910 is supplied to the control terminal 909 of the three-state buffer 907. The input/output control signal and SEL signal from DCU in the correction calculation circuit 10 are supplied to the NAND gate 910.

Figure 10:
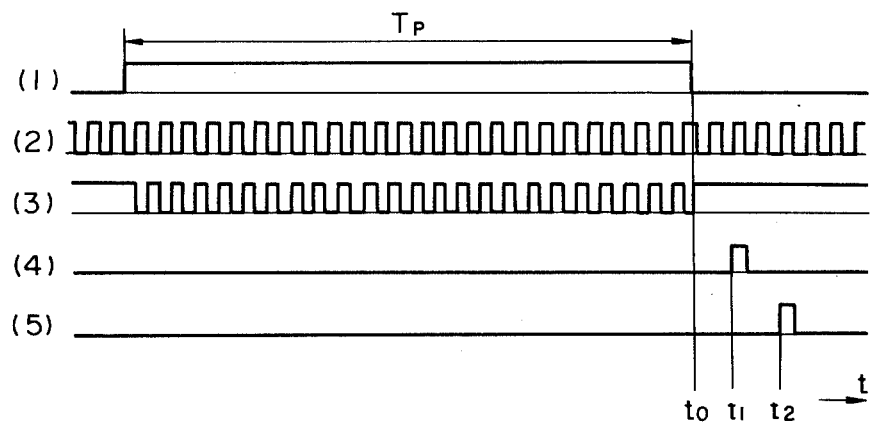
FIG. 10 illustrates the waveforms of the signals of the intake air counting circuit.

When the potential of the output signal of the NAND gate becomes "0", a decimal signal proportional to Q/N from the shift registers 904, 905, and 906 is supplied to the correction calculation circuit 10. For the correction calculation circuit 10, for example, a microcomputer TLCS-12A of 12 bits manufactured by Tokyo Shibaura Electric Co. is used. The waveforms of the signals of the intake air amount counting circuit 9 are illustrated in FIG. 10.

Figure 11:
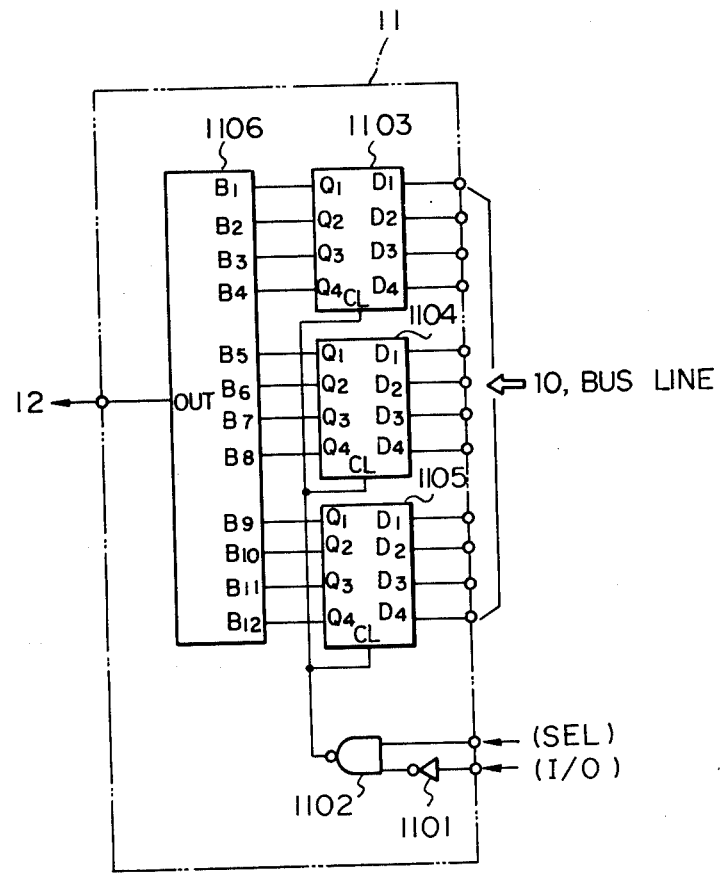
FIG. 11 is a circuit diagram of the digital to analog converter circuit used in the fuel control unit of FIG. 3.

The structure of the digital-to-analog converter circuit 11 is illustrated in FIG. 11. The digital-to-analog converter circuit 11 includes an inverter 1101, a NAND gate 1102, shift registers 1103 through 1105, and a digital-to-analog converter 1106. For the digital-to-analog converter 1106, for example, a DAC80 manufactured by Burr Brown Co. is used. The input/output control signal from the correction calculation circuit 10 is inverted by the inverter 1101 and supplied to the NAND gate 1102. The SEL signal is supplied directly to the NAND gate 1102.

When the command to transmit the air-fuel ratio correction value Fd calculated in the correction calculation circuit 10 to the digital-to-analog circuit 11 is issued, the potential of the input/output control signal becomes "0", and the potential of the SEL signal becomes "1". Hence, the NAND gate 1102 delivers the signal of potential "0". The delivered signal of potential "0" is supplied to the clock terminal CL of each of the shift registers 1103, 1104, and 1105.

The shift registers 1103, 1104, and 1105 are of the same type as used in the rotational speed detection circuit 8. When the signal of potential "0" is supplied to the clock terminal CL, the signals applied to the data input terminals D1, D2, D3 and D4 are taken in and the taken-in signal are delivered from the output terminals Q1, Q2, Q3, and Q4. Thus, the decimal signal of the air-fuel ratio correction value Fd is supplied to the input terminals B1 through B12 of the digital-to-analog converter 1106, and the supplied signal is converted into an analog voltage signal which is delivered from the output terminal OUT. Thus, an analog voltage signal proportional to the Fd data signal is delivered from the output terminal OUT.

The structure and the operation of the fuel calculaton circuit 12 will now be explained. The fuel calculation circuit 12 is a circuit having the same function as the known electronic fuel injection control device (EFI) for four-cylinder engines disclosed in Japanese Unexamined patent publication (Kokai) No. 49-67016.

Referring back to FIG. 3, the intake air signal from air flow meter 44 and the ignition signal from the ignition coil 42 are supplied in synchronization with the rotation of the engine crankshaft to the fuel calculation circuit 12. The fuel calculation circuit 12 calculates the fundamental valve opening period Tp of the fuel injection solenoid valve, $T_p$ being proportional to the air intake amount per engine rotation Q/N, and determines the valve opening period of the fuel injection valve by carrying out correction calculations corresponding to the engine running state on the basis of the calculated $T_p$. Hence it drives the fuel injection valve by using the corrected valve opening period and, accordingly, controls the amount of the fuel supplied to the engine EG.

Figure 12B:
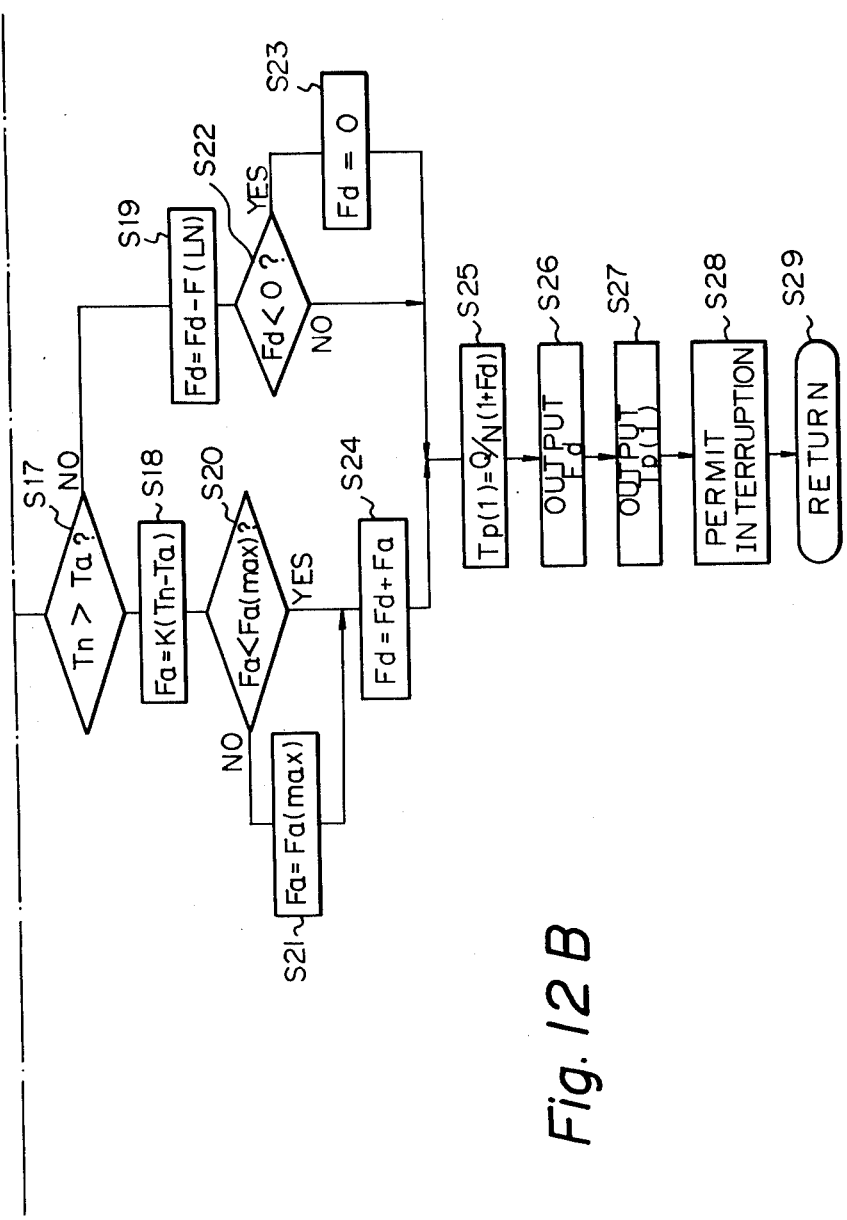

The operation of the correction calculation circuit (CPU) 10 will now be explained with reference to the flow chart of FIG. 12. When the key switch is turned ON, the power is supplied to the device, and, hence, the operation of the correction calculation circuit 10 is started. In step S1, all memories are cleared to cancel the stored data. In step S2, the initial value of the air-fuel ratio correction value Fd is made equal to 2048, which is the middle value of 12 bits, which is equal to 4096.

In step S3, the setting of a master mask is carried out to enable the correction calculation circuit (CPU) to accept an interruption calculation. In step S4, the standby state for the interruption calculation is realized. The state of step S4 is always realized except for the period for execution of the interruption calculation.

After a lapse of time, when the potential of the pulse from the timing pulse generation circuit rises from "0" to "1", the interruption calculation is started. After the interruption calculation is started, in step S10, subsequent interruptions are prohibited. In step S11, a pulse signal is generated. The analog-to-digital converter 701 commences analog-to-digital conversion by using the generated pulse signal as a trigger signal. Simultaneously, the potential of the output pulse signal at the EOC terminal becomes "1". In step S12, the potential of the input signal BSY in the correction calculation circuit (CPU) 10 becomes "1", and, hence, the calculation is stopped.

When the analog-to-digital conversion in the analog-to-digital converter 701 is completed, the potential at the EOC terminal becomes "0", and the calculation of CPU 10 is started again. After the calculation is started again, in step S13, the torque variation value Tn delivered from the analog-to-digital converter 701 is transmitted through the three-state buffer 702 to the correction calculation circuit (CPU) 10. Thus, in step S11, S12, and S13, the torque variation value Tn is analog-to-digital converted and the converted data is read-in.

In step S14, Q/N counted by the intake air counting circuit 9 is read-in. In step S15, the value 1/N, which is the reciprocal of the engine rotational speed counted by the rotational speed detection circuit 8, is read-in. The engine rotational speed N is obtained by calculating the reciprocal of the read-in 1/N.

In FIG. 13 is shown a map which indicates the peak values Ta of the torque variation values when the engine is running at the best rate of fuel consumption, taking N and Q/N as the parameters of engine running condition. This map is stored in a read only memory (ROM).

In step S16, the relevant Ta value stored in the ROM is searched and read-out by using the obtained N and Q/N. In step 17, a decision whether or not the Tn read-in in step S13 is greater than the read-out Ta is carried out so that the decision whether the present air-fuel ratio Tn is richer (RCH) or leaner (LN) than the air-fuel ratio Ta for the best specific fuel consumption is carried out.

When the decision indicates that Tn>Ta, the running condition is construed as being of great torque variation and of lean air-fuel ratio. Hence, the calculation for rich correction COR(RCH) is carried out. When the decision indicates that Tn≦Ta, the running condition is construed as being of small torque variation and of rich air-fuel ratio. Hence, the calculation for lean correction COR(LN) is carried out.

In step S18, where the above-mentioned rich correction is carried out, a rich correction, regarding the air-fuel ratio, which is proportional to the difference between the present torque variation Tn and the aimed torque variation Ta, is carried out. That is, if the torque variation is great, the correction of the air-fuel ratio is carried out to a great extent, while, if the torque variation is small, the correction of air-fuel ratio is carried out to a small extent.

In step S20 and S21, the rich correction is suppressed below the maximum correction value Fa (max), which is sufficient for bringing the engine running condition from the unstable combustion region to stable combustion region. In step S24, the correction value Fa obtained in steps S18, S20, and S21 is added to the air-fuel ratio correction value Fd for the preceding calculation timing so that the air-fuel ratio correction value Fd for the present calculation timing is obtained. That is, the subtraction of F(LN) for lean correction from the air-fuel ratio correction value Fd for the preceding calculation timing is carried out. The value F(LN) has been determined taking the stability and the response characteristic of control into consideration.

In steps S22 and S23, the minimum value of Fd is suppressed not being less than 0 so as not to become a negative value by the calculation in step S19. In step S25, the corrected fundamental fuel injection amount $T_p(1)$, expressed as $T_p(1)=(Q/N)(1+Fd)$, is calculated by using the fundamental Q/N and the air-fuel correction value Fd obtained in the above-described calculation.

In step S26, the signal of the calculated air-fuel ratio correction value Fd is supplied to the digital-to-analog converter circuit 11. In step S27, the calculated corrected fundamental fuel injection amount $T_p(1)$ is supplied to the ignition timing control device IGC. In step S28, permission for interruption is issued. In step S29, the routine returns to the state of execution of the program prior to the occurrence of the interruption.

In accordance with the above-described sequence of steps, the air-fuel ratio supplied for the engine can be regulated so as to realize the best rate of fuel consumption on the basis of the signal from the torque detection device 43.

Figure 14:
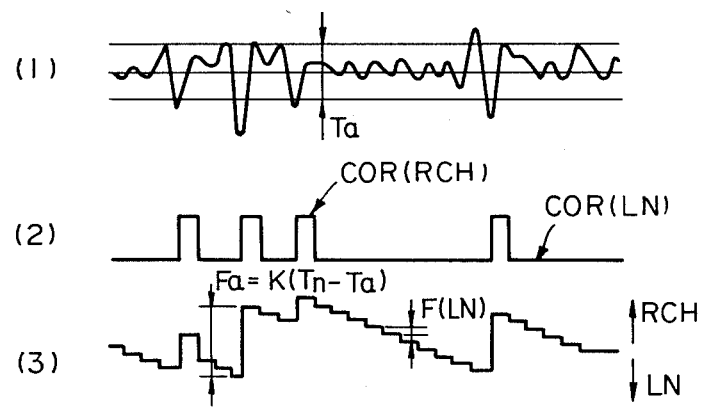
FIG. 14 illustrates the waveforms of the signals corresponding to step S17 to step S25 in the flow chart of FIG. 12.

The calculation for air-fuel ratio correction in steps S17 through S25 with respect to the lapse of time is illustrated in FIG. 14. The change of the torque variation signal is illustrated in FIG. 14, (1); the result of the decision in step in step S17 regarding the degree of the torque variation is illustrated in FIG. 14, (2); and the result of the digital-to-analog conversion of the air-fuel ratio correction value Fd is illustrated in FIG. 14, (3). When the torque variation signal becomes greater than the peak value Ta for the best rate of fuel consumption (FIG. 14, (1)), rich corrections COR(RCH) are carried out (FIG. 14, (2)). Hence, the air-fuel ratio correction value Fd is rich corrected (FIG. 14, (3)). When the torque variation signal is smaller than the peak value Ta for the best rate of fuel consumption (FIG. 14, (1)), lean corrections COR(LN) are carried out (FIG. 14, (2)). Hence, the air-fuel ratio correction value Fd is lean corrected.

Figure 15:
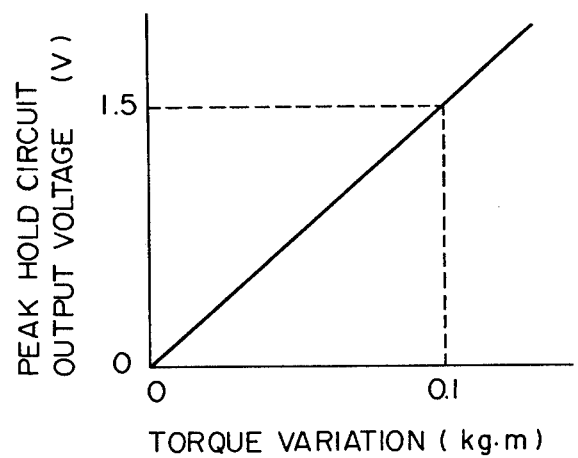
FIG. 15 illustrates the relationship between the engine torque variation and the output voltage of the peak hold circuit.

In the above-described embodiment, the torque variation value for the best rate of fuel consumption is 0.1 kg-m, under the engine running conditions of a rotational speed of 2000 rpm and a torque of 4 kg-m. The relationship between the torque variation value and the detection signal from the peak hold circuit 6 is as illustrated in FIG. 15. Accordingly, the critical value Ta (FIG. 12B, S17) of the decision under the above-described engine running condition is selected as 1.5 volts of the output signal from the peak hold circuit 6. The unit correction value F(LN) for 0.5 sec for lean correction is selected as 0.015 in air-fuel ratio. These values are selected on the basis of results of experiments carried out by the inventors on the stability and the response characteristic of control.

Figure 1:
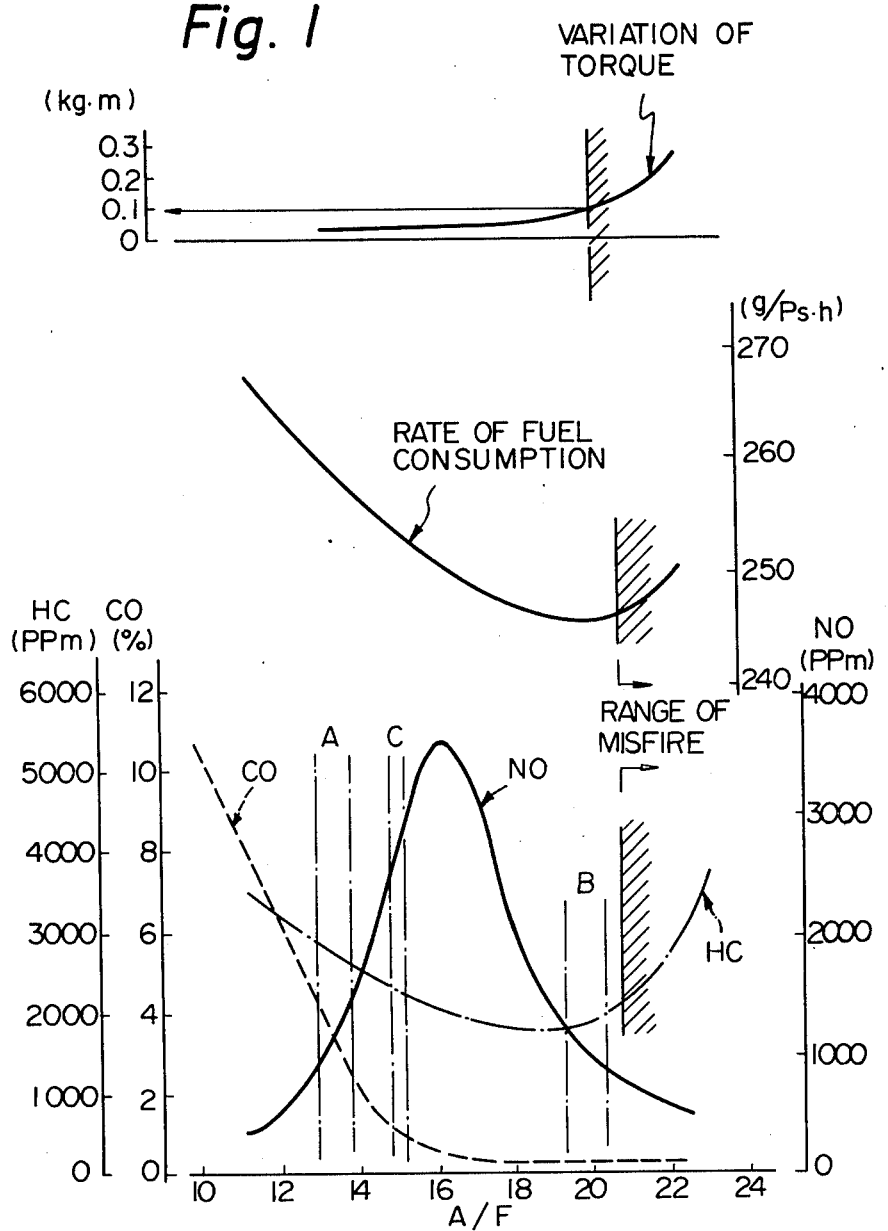
FIG. 1 illustrates the operation characteristics of an internal combustion engine, showing the change of the variation in the engine torque, the change of the rate of fuel consumption, and the change of the composition of the emission with respect to the air-fuel ratio.

The maximum unit correction value Fa(max) of 0.5 sec for rich correction is selected as 0.5 in air-fuel ratio. This enables, in one correction process, the attainment of the air-fuel ratio for the best rate of fuel consumption, such as 20.0, as shown in FIG. 1, from the air-fuel ratio at the border between the misfire region and the stable combustion region, such as 20.5, as shown in FIG. 1.

Figure 16:
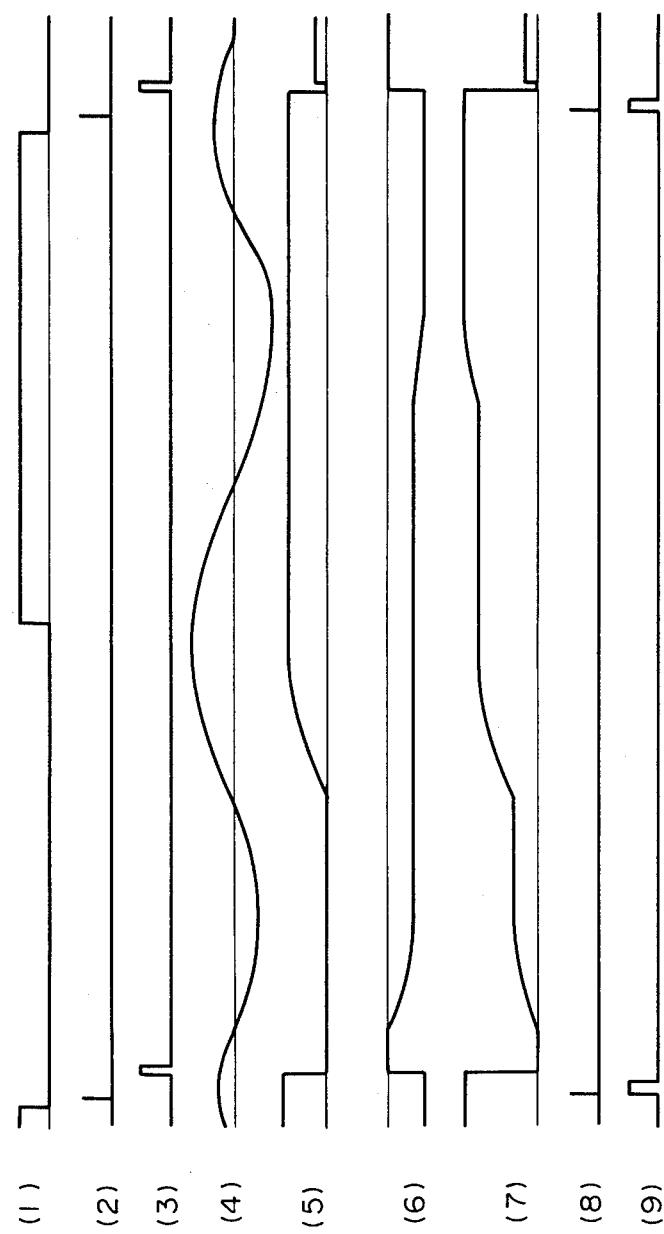
FIG. 16 illustrates the waveforms of the signals in the fuel control circuit.

The proportional constant K is selected for realizing the unit air-fuel ratio correction value 0.5 by the difference between the above-mentioned air-fuel ratio 20.5 and the above-mentioned air-fuel ratio 20.0. In the case of rich correction, quick correction of the air-fuel ratio in a single process is significant from the viewpoint of preventing engine misfires. The waveforms of the signals in the fuel control unit FUC are illustrated in FIG. 16.

The structure of the ignition timing control unit IGC will now be explained with reference again to FIG. 3. A magnetic disc 41a is fixed to a shaft, such as the camshaft of the engine, which rotates at half of the rotational speed of a four-cylinder, four-cycle type engine. The magnetic disc 41a has 80 teeth 41b corresponding 80 equal divisions of the circumference and a single tooth 41c for the entire circumference. The detection of each of the 80 teeth 41b is carried out by an electromagnetic pick-up 41d. The signal from the pick-up 41d is amplified and shaped by a first waveform shaping circuit 21.

A counter circuit 22 receives the signal from the waveform shaping circuit 21 and clock pulses from the clock circuit 28, carries out the counting of the number of the engine rotations, and delivers a decimal code signal proportional to the inverse 1/N of the engine rotational speed. The structure of the counter circuit 22 is the same as the counter portion 8b of the rotational speed detection circuit 8.

In an ignition angle selection circuit 23, the engine rotational speed N is calculated from the data 1/N supplied from the counter circuit 22. The programmed value is read-out on the basis of the engine rotational speed N and the fundamental valve opening period Tp, which is equal to Q/N, from the intake air counting circuit 9 and is interpolated using the read-out programmed value. Hence, the interpolated fundamental advance angle value $\theta_b$ is obtained.

Figure 17:
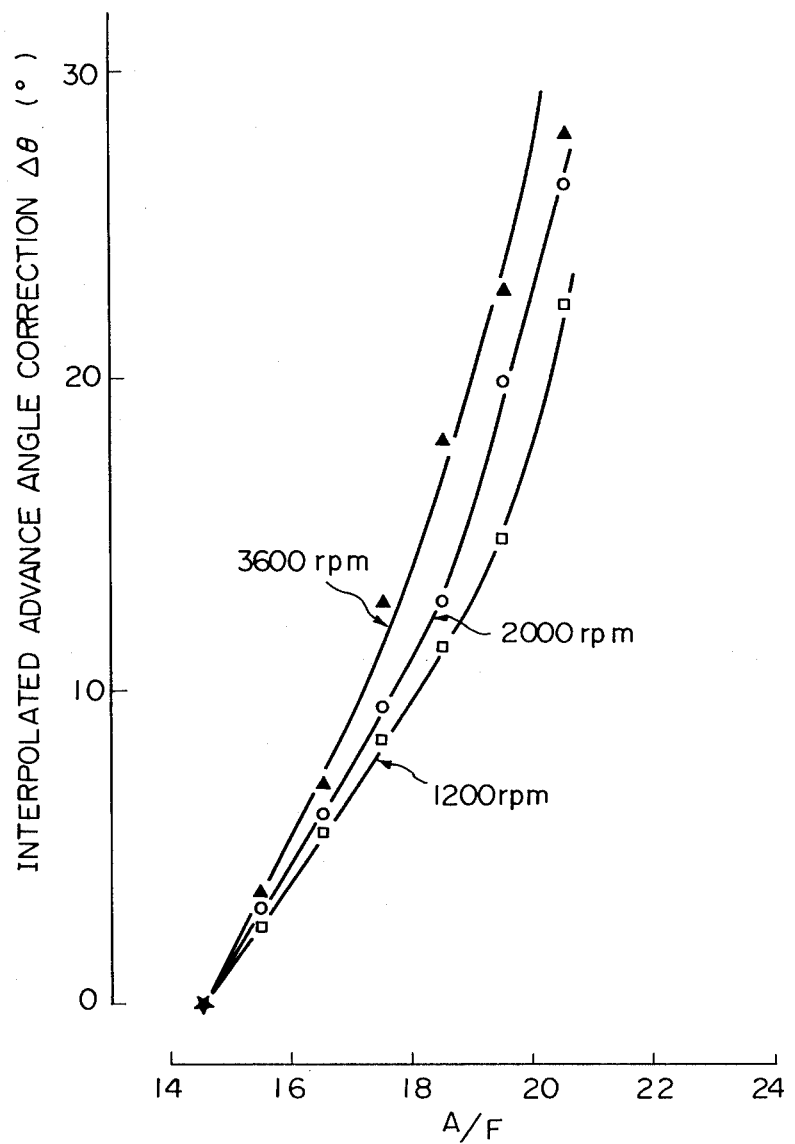
FIG. 17 is a map of the air-fuel ratio A/F versus the interpolated advance angle correction value $\Delta\theta$.

After that, the corrected advance angle value $\Delta\theta$, which is illustrated in FIG. 17, is read-out on the basis of the corrected fundamental fuel injection amount Tp(1) from the correction calculation circuit 10 in the fuel amount control unit FUC and the engine rotational speed N. By adding the read-out corrected advance angle value $\Delta\theta$ to the interpolated fundamental advance angle value $\theta_b$, the resultant advance angle value $\theta$ is obtained.

The retard angle value $\theta(1)$ from the reference angle value $\theta_{60}$ is calculated by subtracting the obtained $\theta$ from $\theta_{60}$. The division of the calculated retard angle value $\theta(1)$ by 9, which 9 represents the angle corresponding to one of the teeth 41b and is obtained by dividing 720 by 80, is carried out to obtain the quotient. The quotient consists of the integer portion "m" and the remainder portion "m(1)" less than unity. The signal of the integer portion "m" is supplied to a first comparator 26, while the signal of the remainder portion "m(1)" is corrected by the data from the counter circuit 22 and is supplied to a second comparator 27.

The tooth 41c of the disc 41a for detecting the reference angle is located at a position $\theta_{60}$, which 60° back of the top dead center of the first cylinder. An electromagnetic pick-up 41e is provided as the angle detector for detecting the position of the tooth 41c. A second waveform shaping circuit 24 is provided for amplifying the output signal of the electromagnetic pick-up 41e and shaping the waveform of the amplified signal into a rectangular waveform. An angle signal circuit 25 is provided for generating signals R having a timing 60° back of the top dead center of the first, the second, the third, and the fourth cylinder on the basis of the output signal of the first waveform shaping circuit 21 and the output signal of the second waveform shaping circuit 24.

The first comparator 26 is reset by the signal R from the angle signal circuit 25. After such resetting, the comparison operation is started. After the comparison operation is started, when the number of the output pulses from the first waveform shaping circuit 21 exceeds the data m of the first output signal of the ignition angle selection circuit 23, the first comparator 26 delivers the output signal changing the potential thereof from HIGH to LOW. The delivered output signal resets the second comparator 27.

From the timing of this resetting, the comparison operation of the second comparator 27 is started. When the number of the clock pulses C4 from the clock circuit 28 exceeds the data "n" of the second output signal of the ignition angle selection circuit 23, the second comparator 27 delivers an output signal changing the potential thereof from HIGH to LOW. This output signal of the second comparator is used as the ignition timing signal.

A current conduction period circuit 29 delivers a HIGH potential signal in response to a signal having a timing 90° back of the top dead center and delivers a LOW potential signal when the potential of the output signal of the second comparator changes from HIGH to LOW.

The period of the HIGH potential of the output signal of the circuit 29 defines the current conduction period of the ignition device 42. A power amplifier 30 is a known igniter circuit for driving the ignition device. The output signal of the ignition device 42 is supplied to a high tension distribution device in the distributor.

The counter circuit 22 includes a NAND gate which is opened to pass the clock pulse C2 from the clock circuit 28 while receiving the output signal from the first waveform shaping circuit 21, a counter for counting the pulses passing the NAND gate, a latch circuit for storing temporarily the count of the counter and supplying the stored count to the ignition angle selection circuit 23, and a signal generator for generating the reset signal for the counter and the storage command signal for the latch circuit. For the ignition angle selection circuit 23, for example, a microcomputer TLCS-12A manufactured by Tokyo Shibaura Electric Co. is used.

Figure 18:
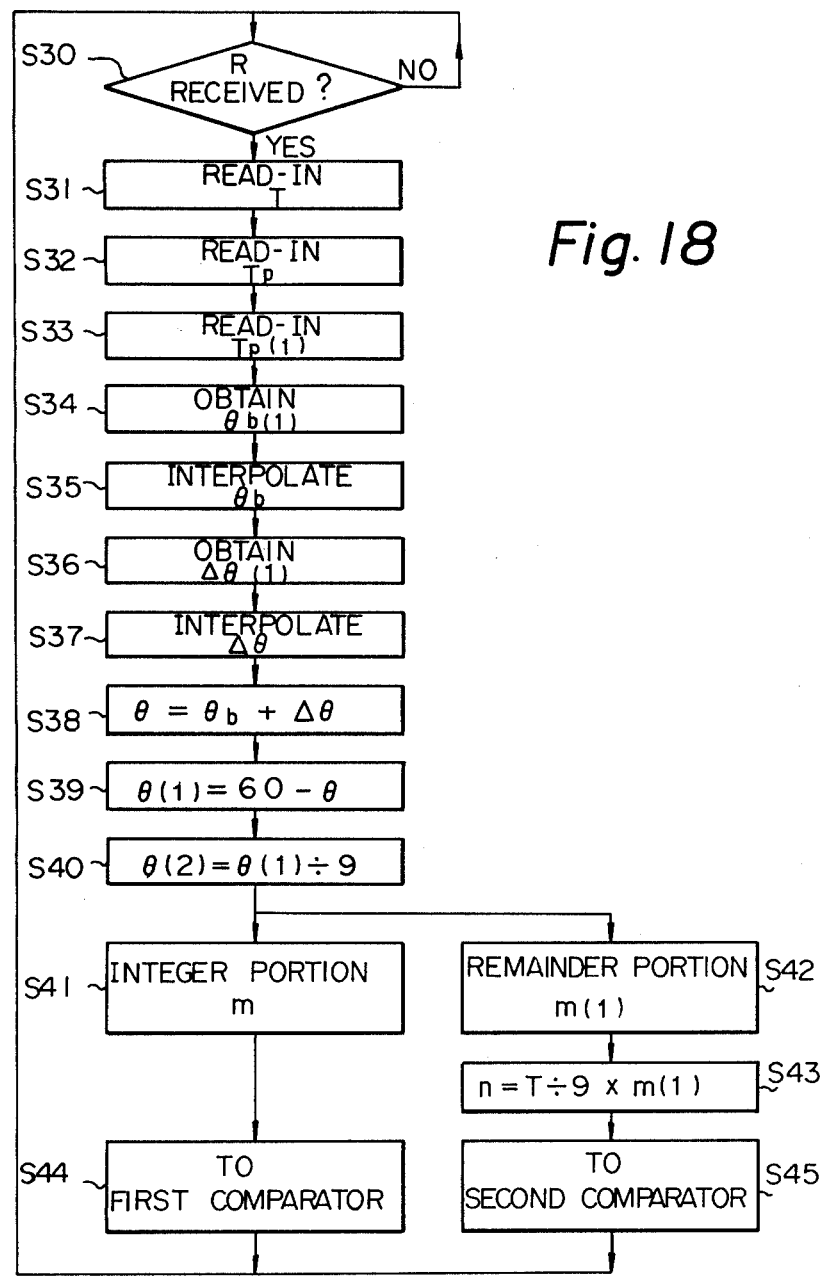
FIG. 18 is an example of a flow chart of the operation of the ignition timing control unit.

An example of the flow chart of the operation of the ignition timing control unit IGC is illustrated in FIG. 18. In step S30, the decision whether or not the signal R from the angle selection circuit 25 has been received is carried out. When the decision is YES, the process proceeds to step S31, while when the decision is NO, the step S30 is repeated until the signal R comes in.

In step S31, the data T from the counter circuit 22 is read in. In step S32, the data Tp from the intake air counting circuit 9 of the fuel control unit FUC is read in. In step S33, the data $T_p(1)$ from the correction calculation circuit 10 is read in.

In step S34, the fundamental advance angle value $\theta_b(1)$ is read out from a prepared map on the basis of the data T and the data Tp. In step S35, the interpolated fundamental advance angle value $\theta_b$ is obtained by interpolation.

In step S36, the corrected advance angle value $\Delta\theta(1)$ is read out from another prepared map on the basis of the data T and the data $T_b(1)$. In step S37, the corrected advance angle value $\Delta\theta$ is obtained by interpolation. In step S38, the resultant advance angle value $\theta$ is obtained by summing angle value $\theta_b$ and the corrected advance angle value $\Delta\theta$.

In step S39, the retard angle value $\theta(1)$ from the reference angular position $\theta_{60}$ is obtained by substracting the resultant advancd angle value $\theta$ from the refence angle value 60°. In step S40, the value $\theta(2)$ is obtained by dividing the retard angle value $\theta(1)$ by angle value 9° (engine angle) of the angle of a tooth of the disc 41a.

In step S41, the integer portion "m" of the $\theta(2)$ is obtained. In step S42, the remainder portion "m(1)" of the $\theta(2)$ is obtained.

In step S43, the value n is calculated by dividing the value T read-in in step S31 by the angle value 9° of one tooth and multiplying the obtained quotient by the value "m(1)" obtained in step S42. The value "m(1)" corresponds to an angle not greater than 9°. The calculation in step S43 is to obtain by proportional allotment the time length n corresponding to the value "m(1)", based on the fact that the time length for the angle 9° for one tooth T.

In step S44, the data of the integer "m" is supplied to the first comparator 26. In step S45, the data n obtained in step S43 is supplied to the second comparator 27. After that, the process returns to step S30.

Figure 19:
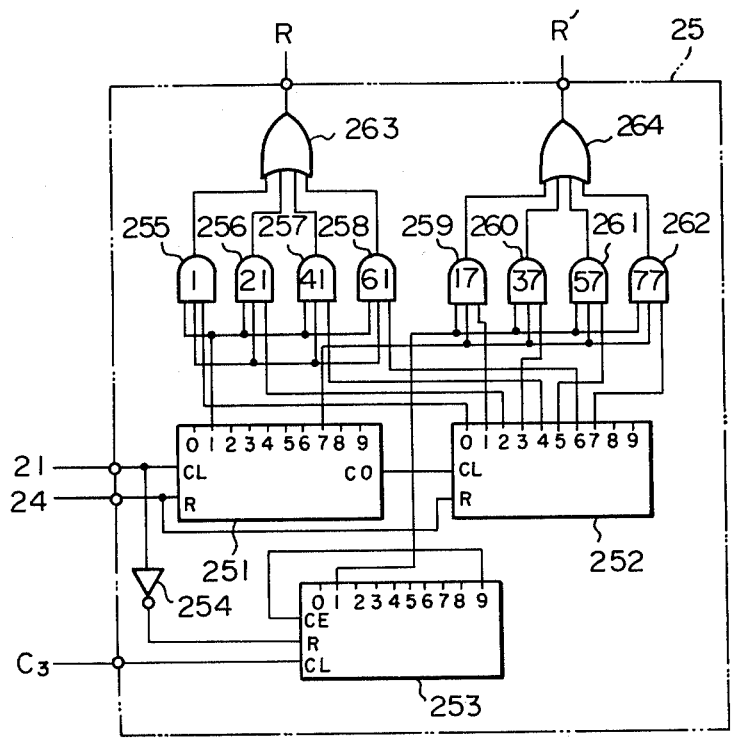
FIG. 19 illustrates the structure of the angle signal circuit.

The structure of the angle signal circuit 25 is illustrated in FIG. 19. The angle signal circuit 25 includes decimal counters with dividers 251, 252, and 253, an inverter 254, three-input AND gates 255 through 262, and four-input OR gates 263 and 264. The clock input terminal CL of the counter 251 receives the output signal of the first waveform shaping circuit 21 (FIG. 20, (2)). The reset input terminal R of the counter 251 receives the output signal of the second waveform shaping circuit 24 (FIG. 20(1)).

The clock input terminal CL of the counter 252 is connected to the carry-out terminal CO of the counter 251. The reset input terminal R of the counter 252 is connected to the reset input terminal R of the counter 251. The counters 251 and 252 are operated as a decimal counter with dividers from 0 to 99.

The input terminal of the inverter 254 is connected to the output terminal of the first waveform shaping circuit 21. The output terminal of the inverter 254 is connected to the reset input terminal R of the counter 253.

The clock signal $C_3$ from the clock circuit 28 is supplied to the clock input terminal CL of the counter 253. The output terminal for "9" is connected to the clock enable terminal CE in the counter 253.

The AND gate 255 receives signal "1" of counter 251, signal "0" of counter 252, and signal "1" of counter 253. The AND gate 256 receives signal "1" of counter 251, signal "2" of counter 252, and signal "1" of counter 253. The AND gate 257 receives signal "1" of counter 251, signal "4" of counter 252, and signal "1" of counter 253. The AND gate 258 receives signal "1" of counter 251, signal "6" of counter 252, and signal "1" of counter 253. The four-input OR gate 263 receives the output signals of the AND gates 255 through 258 and delivers signal R (FIG. 20, (4)).

The AND gate 259 receives signal "7" of counter 251, signal "1" of counter 252, and signal "1" of counter 253. The AND gate 260 receives signal "7" of counter 251, signal "3" of counter 252, and signal "1" of counter 253. The AND gate 261 receives signal "7" of counter 251, signal "5" of counter 252, and signal "1" of counter 253. The AND gate 262 receives signal "7" of counter 251, signal "7" of counter 252, and signal "1" of counter 253. The four-input OR gate 264 receives the output signals of the AND gates 259 through 262 and delivers signal R'.

Figure 20:
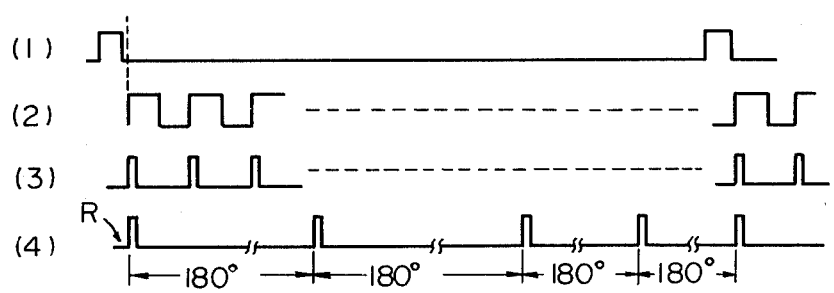
FIG. 20 illustrates the waveforms of the signals in the angle signal circuit.

The operation of the angle signal circuit 25 of FIG. 19 will now be explained with reference to the waveforms of FIG. 20. The falling point from HIGH to LOW potential of the waveform of the output signal of the second waveform shaping circuit (FIG. 20, (1)) is positioned at 2° through 3° back of the angle 60° back of the top dead center of the first cylinder. The waveform of the output signal of the first waveform shaping circuit 21 is shown in FIG. 20, (2). The teeth 41b and 41c of the disc 41a and the pick-up's 41d and 41e are arranged in such a manner that the first rising point in the output signal of the first waveform shaping circuit 21 is positioned 60° back of the top dead center of the first cylinder.

The signal, which is the reversal of the signal of FIG. 20, (2), is supplied to the reset terminal R of the counter 253 so that the counter 253 commences counting in the low level A clock signal $C_3$ of 10 kHz is supplied to the clock input terminal CL of the counter 253. When the ninth pulse is supplied, the counting of the counter 253 is stopped due to the application of a signal to the clock enable terminal CE. Thus, the output terminal for "1" of the counter 253 delivers the signal of FIG. 20, (3).

The output signal of the AND gate 255 is produced when the AND logic is established by the first pulse from the first waveform shaping circuit 2 and the output pulse of the counter 253 after the reference pulse of FIG. 20, (1) is received. The output signal of the AND gate 256, which is the 21st signal, corresponds to the before top dead center (BTDC) 60° of the third cylinder. Similarly, the output signal of the AND gate 257 corresponds to BTDC 60° of the fourth cylinder. Similarly, the output signal of the AND gate 258 corresponds to BTDC 60° of the second cylinder.

The output signal of the AND gate 259 is positioned at 144°, which is calculated as $(17-1)\times 9=144$, because the output signal of the AND gate 259 is the 17th pulse with respect to the reference position. This position of the output signal of the AND gate 259 is 36° advanced from the position of the output signal of the AND gate 256.

Similarly, the output signal of the AND gate 260 is positioned at 324°, which is 36° advanced from the position of the output signal of the AND gate 257. Similarly, the output signal of the AND gate 261 is positioned at 504°, which is 36° advanced from the position of the output signal of the AND gate 258. Similarly, the output signal of the AND gate 262 is positioned at 684°, which is 36° advanced from the position of the output signal of the AND gate 255.

The OR gate 264 produces the output signal R' as the OR logic of the output signals of the AND gates 259 through 262. The position of the output signal R' of the OR gate 264 is 36° advanced from the BTDC 60° of each of the cylinders.

The first comparator 26 is a known circuit including a memory, a counter, and a gate which is, for example, CD 4063 manufactured by Radio Corporation of America. The first comparator is reset by the signal R from the angle signal circuit 23. The counter counts the number of the angle signals from the first waveform shaping circuit 21. One pulse of this angle signal corresponds to 9° of the crankshaft angle. When the count exceeds the first output value "m" in the output data of the ignition angle selection circuit 23, the potential of the output signal of the first comparator 26 becomes LOW. Thus, the angle from the resetting of the first comparator 26 to the falling-down to LOW potential of the output signal is proportional to the first output data "m" of the ignition angle selection circuit 23. It is significant that the timing of the falling-down to LOW potential of the output signal coincides with the retard angle timing of the first output data "m" of the ignition angle selection circuit 23.

Since the input clock pulse for the first comparator 26 is the output signal of the first waveform shaping circuit 21 and, hence, represents the crankshaft angle itself, the input clock pulse for the first comparator 26 can represent the variation of rotation of the crankshaft if such variation occurs. The structure of the second comparator 27 is fundamentally the same as the structure of the first comparator 26. The bit number of the counter and the comparator can be selected in accordance of the bit number of the input signal in the second comparator 27. In the embodiment of FIG. 3, the bit number is selected as 10. The input clock pulse is the clock pulse $C_4$ of constant frequency 500 kHz supplied from the clock circuit 28.

Upon the falling-down from HIGH to LOW potential of the output signal of the first comparator 26, the second comparator 27 commences counting. When the second output data "n" becomes equal to the number of clock pulse $C_4$, the potential of the output signal of the second comparator 27 falls down from HIGH to LOW potential. The timing of this falling-down to LOW potential corresponds to the ignition timing.

The current conduction period circuit 29, which is a circuit for selecting the current start timing and current shut-off timing, includes a monostable multivibrator and an R-S flip-flop circuit. The current conduction period circuit 29 is reset by the signal R' from the angle signal circuit 25.

Upon this resetting, the potential of the output signal of the circuit 29 rises up to HIGH.

When the potential of the output signal of the second comparator 27 falls down from the HIGH to LOW potential, the circuit 29 is set and the potential of the output signal of the circuit 29 falls down from the HIGH to LOW potential.

The timing of the rise of the potential of the output signal of the circuit 29 is the timing for the start of the start of the current conduction for the ignition coil. The timing of the falling-down of the potential of the output signal of the circuit 29 is the timing of the shut-off of the current conduction for the ignition coil, that is, the ignition timing. The power amplifier circuit 30 amplifies the output signal power of the circuit 29 and produces the output signal for driving the ignition coil 42.

In the above description, different microcomputers are used for the correction calculation circuit 10 in the fuel control unit FUC and the ignition angle selection circuit 23 in the ignition timing control unit. However, instead of such different microcomputers, a single microcomputer may be used commonly for both the correction calculation circuit 10 and the ignition angle selection circuit 23.

We claim:

1. A method for regulating an air-fuel ratio and an ignition timing in an internal combustion engine by detecting the engine running conditions, calculating a control output signal based on the detected engine running conditions, and controlling the air-fuel ratio of the engine and the ignition timing of the engine using the calculated output signal, said method comprising the steps of:

carrying out a calculation, using the signals of sensors for detecting engine running conditions, to produce a signal S(12) for controlling the amount of the fuel so as to attain a lean air-fuel ratio which does not cause any combustion variations;

obtaining a read-out basic advance angle value $\theta_b(1)$ on the basis of the detected engine running conditions;

obtaining an interpolated basic advance value $\theta_b(1I)$ on the basis of the obtained read-out basic advance angle value $\theta_b(1)$;

obtaining a read-out advance angle correction value $\Delta\theta(1)$ on the basis of the detected engine running conditions;

obtaining an interpolated advance angle correction value $\Delta\theta$ on the basis of the obtained read-out advance angle correction value $\Delta\theta(1)$;

obtaining an ignition timing value on the basis of the detected engine running conditions and the fuel amount for attaining a lean air-fuel ratio; and producing an ignition timing signal representing the ignition timing corresponding to the lean air-fuel ratio.

2. A method as defined in claim 1, wherein the interpolated advance angle correction value $\Delta\theta$ is derived from the calculation of the air-fuel ratio in the engine using the detected intake air amount and the detected fuel amount.

3. A method as defined in claim 1, wherein the interpolated advance angle correction value $\Delta\theta$ is derived from the calculated air-fuel ratio in the engine and the detected engine rotational speed.

4. A device for regulating an air-fuel ratio and an ignition timing in an internal combustion engine comprising:

(a) means for sensing the running state of the engine;
(b) means for detecting the variation in combustion in the engine;
(c) means for correcting the air-fuel ratio supplied in the engine according to the detected combustion variation; and
(d) means for calculating an interpolated basic advance angle value $\theta_b$ on the basis of a signal from the engine sensor means and a signal from the fuel control means, obtaining an interpolated advance angle correction value $\Delta\theta$ on the basis of the air-fuel ratio correction amount and a signal from the engine sensor means, obtaining an ignition timing value on the basis of detected engine running conditions and a fuel amount for attaining a lean air-fuel ratio, and producing an ignition timing signal representing the ignition timing corresponding to the lean air-fuel ratio.

5. A device as defined in claim 4, wherein said means for calculating an interpolated basic advance angle value, obtaining an interpolated advance angle correction value and an ignition timing value, and producing an ignition timing signal comprises an electric control unit.

6. A device as defined in claim 4, wherein said combustion variation detection means comprises a torque detection means.

7. A device as set forth in claim 6, wherein said torque detection means includes a rubber mount and a rubber mount cover superposed on said pressure sensor.

8. A device as set forth in claim 4, wherein said device provides an ignition coil for supplying the signal in synchronization with the engine crankshaft rotation and an air-flow meter.

9. A device as set forth in claim 5, wherein said electronic control unit includes a filter circuit for filtering with filter characteristics over a predetermined frequency band.

10. A device as set forth in claim 9, wherein said electronic control unit includes means for detecting a peak value in the outputs from said filter circuit within a predetermined period of time.

11. A device as set forth in claim 9, wherein said electronic control unit comprises:
  a clock circuit;
  a timing pulse generator circuit which receives output signals produced by said clock circuit;
  a peak hold circuit for receiving output signals produced by said timing pulse generator circuit and a filter circuit;
  an analog-to-digital converter circuit for receiving output signals produced by said peak hold circuit;
  a calculation circuit for calculating a value for correcting air-fuel ratio upon transmission and reception of signals relative to said analog-to-digital converter circuit, a circuit for detecting the engine speed, and a circuit for metering the amount of the intake air;
  a digital-to-analong converter circuit for receiving output signals from said calculation circuit; and
  a fuel amount control circuit which generates a fuel control signal upon receipt of output signals from said digital-to-analog converter circuit, said ignition coil, said an air-flow meter.

* * * * *

UNITED STATES PATENT AND TRADEMARK OFFICE
CERTIFICATE OF CORRECTION

PATENT NO.  : 4,478,185
DATED       : October 23, 1984
INVENTOR(S) : H. OBAYASHI et al It is certified that error appears in the above-identified patent and that said Letters Patent is hereby corrected as shown below:

In claim 1, column 18, line 10, should read:

--obtaining an interpolated basic advance angle value $\theta_b$--

Signed and Sealed this

Fifteenth Day of October 1985

[SEAL]

Attest:

Attesting Officer

DONALD J. QUIGG

Commissioner of Patents and Trademarks—Designate